Sept. 23, 1930.  H. JOHNSON  1,776,732
COMBINED SPRING AND SHOCK ABSORBER
Filed Oct. 26, 1928
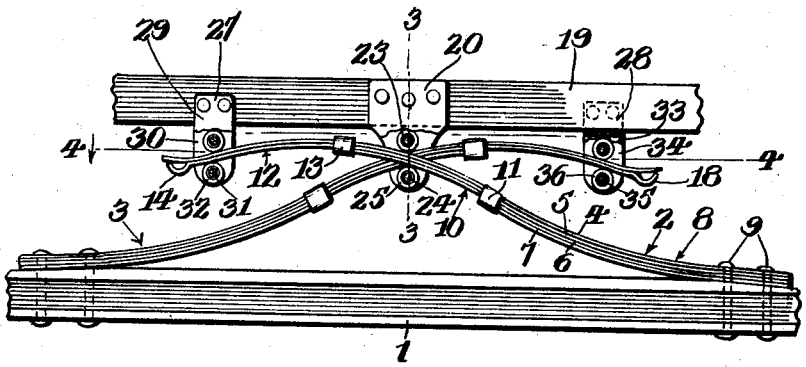
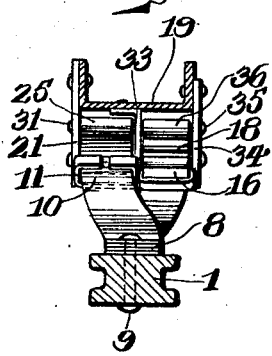 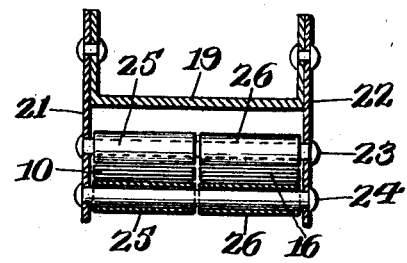
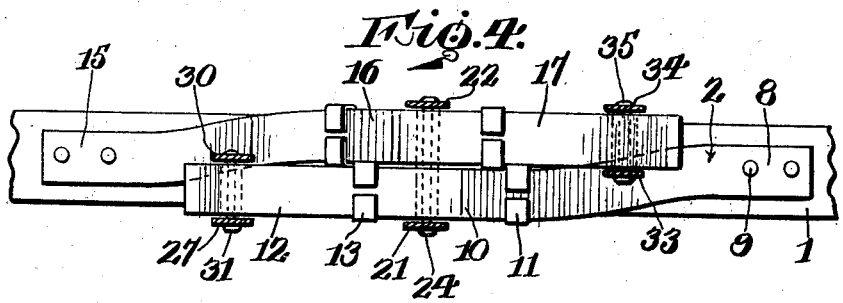
INVENTOR.
Herman Johnson
BY Geo. F. Kimmel
ATTORNEY.

Patented Sept. 23, 1930

1,776,732

UNITED STATES PATENT OFFICE

HERMAN JOHNSON, OF FELCH, MICHIGAN

COMBINED SPRING AND SHOCK ABSORBER

Application filed October 26, 1928. Serial No. 315,168.

This invention relates to a combined spring and shock absorber and has for its primary object to provide, in a manner as hereinafter set forth, a spring for resiliently supporting the body of a vehicle on the chassis thereof, whereby any reciprocatory movement of the body relative to the chassis is yieldingly resisted during the travel of said body in either direction.

A further object of the invention is to provide a device for the purpose aforesaid, whereby the body is supported in a manner to permit a limited, yet free rocking motion thereto in either a longitudinal or a transverse direction.

With the foregoing and other objects in view the invention consists of the novel construction, combination and arrangement of parts as hereinafter more particularly described and illustrated in the accompanying drawings, wherein for the purpose of illustration is shown an embodiment of my invention, but it is to be understood that changes, variations and modifications may be resorted to which fall within the scope of the invention as claimed.

In the accompanying drawings in which like numerals are employed to designate like parts throughout the same:—

Figure 1 is an elevation of a combined spring and shock absorber constructed in accordance with this invention, showing the association of the same with the front axle and body of a motor vehicle.

Figure 2 is a sectional elevation of the embodiment shown in Figure 1, as the same would appear when viewed from a right angle.

Figure 3 is a section taken on line 3—3 of Figure 1.

Figure 4 is a section taken on line 4—4 of Figure 1.

Referring in detail to the drawings the numeral 1 designates the front axle of a vehicle upon which is supported a pair of spring elements designated by the numerals 2 and 3 respectively. The spring element 2 is of the laminated type and in the embodiment shown consists of four leaves designated respectively by the numerals 4, 5, 6 and 7. The lower end portion 8 of the element 2 is formed from the leaves 4, 5, 6 and 7 and is secured to the axle 1 by means of suitable holdfast devices 9 which extend through the portion 8 and axle 1. The intermediate portion 10 of the element 2 is formed of the leaves 4, 5 and 6, and the free end of the leaf 7, which terminates adjacent the intermediate portion 10, is secured to the remaining leaves by means of a clip 11. The upper end portion 12 of the element 2 is formed of the leaves 4 and 5, and the free end of the leaf 6, which terminates adjacent the upper end portion 12, is secured to the leaves 4 and 5 by means of a clip 13. The leaf 5 is formed at its upper end with an arc 14 which is substantially semi-circular in form and has its ends bearing against the lower surface of the leaf 4. The lower end portion 8 of the element 2 is disposed in parallel relation to the axle 1, and the intermediate and upper end portions 10 and 11 of the element 2 are offset in a forward direction with respect to the lower end portion 8.

The spring element 3 is formed in the same manner as the spring element 2 and consists of a lower end portion 15, an intermediate portion 16 and an upper end portion 17. The lower end portion 15 is disposed in alignment with the lower end portion 8 and the intermediate portion 16 and upper end portion 17 are offset rearwardly with respect to the lower end portion 15. The upper end portion 17 is formed with an arc 18 in the same manner as heretofore described in connection with the arc 14. The elements 2 and 3 extend upwardly and inwardly with the intermediate portions 10 and 16 intersecting at the plane of the transverse median of the axle 1.

The numeral 19 designates a cross member of a vehicle body, and depending therefrom, at the transverse median thereof, is a hanger element 20 which consists of a pair of plates 21 and 22 respectively, secured at their upper ends to opposite sides of the cross member 19. Connecting the depending portions of the plates 21 and 22 is a pair of superposed, parallel pins 23 and 24, upon which are mounted endwise aligning pairs of superposed rollers 25 and 26 respectively. In the assembled relation of the spring elements 2 and 3 and the hanger 20, the intermediate portion 10 of the element 2 passes between the pair of rollers 25 and the intermediate portion 16 of the element 3 passes between the pair of rollers 26. Each pair of rollers is appropriately spaced with respect to the thickness of the element passing therebetween to permit of a free longitudinal movement of said element.

Depending from the cross member 19 is a pair of hangers 27 and 28, one of which is disposed on either side of the hanger 20. The hanger 27 consists of a plate 29, the upper end of which is secured to the forward face of the member 19, and a bracket 30 which is secured to the lower face of the member 19 adjacent the longitudinal median of said member.

Connecting the depending portions of the plate 29 and bracket 30 is a pair of superposed pins 31, upon which is mounted a pair of rollers 32. The hanger 28 consists of a plate 34, the upper end of which is secured to the rearward face of the cross member 19, and a bracket 33 which is secured to the lower face of such member adjacent the longitudinal median thereof. Connecting the depending portions of the plate 34 and bracket 33 is a pair of pins 35 upon which is mounted a pair of rollers 36. In the assembled relation of the spring elements 2 and 3 with the brackets 27 and 28, the upper end portion 12 of the element 2 extends between the rollers 32 and the upper end portion 17 of the element 3 extends between the rollers 36.

When a downward pressure is exerted on the cross member 19 as is caused by road conditions, the intermediate portions 10 and 12 of the spring element 2, and 16 and 17 of the spring element 3 respectively slide freely between the respective pairs of rollers 25, 32, 26 and 36. Upon the rebound of the cross member 19, the upper end portions 12 and 17 are prevented from being withdrawn from between the rollers 32 and 36 respectively by means of the arcs 14 and 18 formed on the upper end portions of said elements. As the arcuate portions 14 and 18 are drawn into contact with the rollers 32 and 36, the arcuate portions yieldingly resist the longitudinal movement of the elements 2 and 3 before they become lodged between the respective pairs of rollers to stop such movement. After the movement of the elements 2 and 3 has been stopped by the arcs 14 and 18, the upward movement of the cross member 19 is further yieldingly resisted owing to the resiliency of the members 2 and 3 throughout the entire length of the latter.

It is to be understood that the form of the invention herewith shown and described is to be taken as the preferred example of the same and that various changes in the details of construction may be resorted to without departing from the spirit of the invention or the scope of the appended claims.

What I claim is:

1. A device of the character described comprising, a pair of oppositely disposed, upwardly extending, resilient, compressible elements of the laminated type adapted to have their lower ends anchored to the axle of a vehicle, endwise aligning pairs of superposed rollers adapted to be suspended from the body of the vehicle and having the intermediate portions of said elements extending therebetween, spaced pairs of superposed rollers adapted to be suspended from the body of the vehicle, each pair of said spaced rollers having the upper end portion of an element extended therebetween, and a stop formed on the extreme end of each upper end portion, each of said elements being offset for a portion of its length to provide for the positioning of such portion of one element in advance of such portion of the other element whereby the anchored portions of said elements may be disposed in longitudinal alignment.

2. A device of the character described comprising, a pair of oppositely disposed, upwardly extending, resilient, compressible elements of the laminated type adapted to have their lower ends anchored to the axle of a vehicle, endwise aligning pairs of superposed rollers adapted to be suspended from the body of the vehicle and having the intermediate portions of said elements extending therebetween, and spaced pairs of superposed rollers adapted to be suspended from the body of the vehicle, each pair of said spaced rollers having the upper end portion of an element extended therebetween, the upper end portion of each element consisting of a pair of spring leaves, one of said leaves being formed at its outer extremity with an arc having its ends bearing against the other of said leaves to provide a yielding stop when drawn between the rollers associated therewith.

3. A device of the character described comprising, a pair of oppositely disposed, upwardly extending, resilient, compressible elements of the laminated type adapted to have their lower ends anchored to the axle of a vehicle, endwise aligning pairs of superposed rollers adapted to be suspended from the body of the vehicle and having the intermediate portions of said elements extending therebetween, spaced pairs of superposed rollers adapted to be suspended from the body of the vehicle, each pair of said spaced rollers having the upper end portion of an element extended therebetween, the upper end portion of each element consisting of a pair of spring leaves, one of said leaves being formed at its outer extremity with an arc bearing against the other of said leaves to provide a resilient stop, and each of said elements being offset for a portion of its length to provide for the positioning of such portion of one element in advance of such portion of the other element whereby the anchoring portions of said elements may be disposed in longitudinal alignment.

4. A device of the character described comprising, a pair of spring elements adapted to be secured at one end to a vehicle axle, a hanger member adapted to be suspended from the frame of the vehicle body and having aligned pairs of superposed, spaced rollers, a pair of hanger members adapted to be suspended from said frame in spaced relation to and on opposite sides of said first mentioned hanger member, a pair of superposed, spaced rollers carried by each of said pair of hanger members, said spring elements extending inwardly and upwardly in intersected planes and each having an intermediate portion passing between a pair of said rollers carried by said first mentioned hanger member, each of said spring elements further having its upper end portion passing between a pair of rollers of said pair of hanger members, and means on the free ends of said upper end portions for yieldingly preventing the withdrawal of said spring elements from between the rollers of said pair of hanger members.

5. A device of the character described comprising, a pair of spring elements adapted to be secured at one end to a vehicle axle, a hanger member adapted to be suspended from the frame of the vehicle body and having aligned pairs of superposed, spaced rollers, a pair of hanger members adapted to be suspended from said frames in spaced relation to and on opposite sides of said first mentioned hanger member, a pair of superposed, spaced rollers carried by each of said pair of hanger members, said spring element extending inwardly and upwardly in intersected planes and each having an intermediate portion passing between a pair of said rollers carried by said first mentioned hanger member, each of said spring elements further having its upper end portion passing between a pair of rollers of said pair of hanger members, and the upper end portion of each element consisting of a pair of spring leaves, one of said leaves being formed at its outer extremity with an arc bearing against the other of said leaves to provide a resilient stop, each of said elements being offset for a portion of its length to provide for the positioning of such portion of one element in advance of such portion of the other element whereby the secured ends of said elements may be disposed in longitudinal alignment.

In testimony whereof, I affix my signature hereto.

HERMAN JOHNSON.